US008562237B2

(12) United States Patent
Pina Lopez et al.

(10) Patent No.: US 8,562,237 B2
(45) Date of Patent: Oct. 22, 2013

(54) BALL-JOINT SUPPORT FOR THIN PARTS

(75) Inventors: Jose Maria Pina Lopez, Madrid (ES); Enrique Vera Villares, Madrid (ES)

(73) Assignee: Airbus Operations, S.L., Getafe (ES)

( * ) Notice: Subject to any disclaimer, the term of this patent is extended or adjusted under 35 U.S.C. 154(b) by 0 days.

(21) Appl. No.: 13/339,578

(22) Filed: Dec. 29, 2011

(65) Prior Publication Data

US 2012/0170971 A1  Jul. 5, 2012

Related U.S. Application Data

(63) Continuation of application No. PCT/ES2010/070280, filed on Apr. 30, 2010.

(51) Int. Cl.
*F16C 11/00* (2006.01)
*F16C 23/04* (2006.01)

(52) U.S. Cl.
USPC .......................................... 403/131; 384/206

(58) Field of Classification Search
USPC .................... 403/131; 384/203, 206
See application file for complete search history.

(56) References Cited

U.S. PATENT DOCUMENTS

| | | | | |
|---|---|---|---|---|
| 4,140,413 A | * | 2/1979 | Conrad | 403/131 |
| 4,227,826 A | * | 10/1980 | Conrad | 384/206 |
| 5,280,871 A | | 1/1994 | Chuang | |
| 5,346,315 A | | 9/1994 | Strong et al. | |
| 7,073,970 B2 | * | 7/2006 | Gercke et al. | 403/132 |
| 7,828,482 B2 | * | 11/2010 | Beausoleil et al. | 384/276 |
| 2004/0105722 A1 | * | 6/2004 | Gercke et al. | 403/135 |
| 2004/0265046 A1 | * | 12/2004 | Hoppner et al. | 403/122 |
| 2005/0045783 A1 | | 3/2005 | Brumley | |
| 2005/0115785 A1 | * | 6/2005 | Thomas | 188/321.11 |
| 2006/0120644 A1 | * | 6/2006 | Smith | 384/276 |
| 2007/0096005 A1 | | 5/2007 | March et al. | |
| 2007/0292062 A1 | * | 12/2007 | Arnold et al. | 384/206 |
| 2008/0040886 A1 | * | 2/2008 | Arnold et al. | 16/275 |
| 2008/0056631 A1 | * | 3/2008 | Beausoleil et al. | 384/276 |
| 2008/0087783 A1 | | 4/2008 | Istas et al. | |
| 2009/0290822 A1 | * | 11/2009 | Wilson et al. | 384/206 |
| 2012/0170971 A1 | * | 7/2012 | Pina Lopez et al. | 403/122 |

OTHER PUBLICATIONS

International Search Report mailed Jul. 15, 2010 in PCT/ES2010/070280 filed Apr. 30, 2010 (with English Translation).

* cited by examiner

*Primary Examiner* — Victor MacArthur
(74) *Attorney, Agent, or Firm* — Oblon, Spivak, McClelland, Maier & Neustadt, L.L.P.

(57) ABSTRACT

A ball-joint support for thin parts, through which a ball-joint is operably coupled to a thin part, and where the ball-joint includes an inner part with a central coaxial orifice through which a longitudinal axis is introduced, and an outer part that engages complementarily to the inner part is provided. The ball joint support includes a cap including a central through hole in which the ball joint is embedded inside via the outer part, and externally, the cap is embedded in a cylindrical opening included in the thin part, and mechanical means for axial retention of the thin part to the cap, wherein the thickness of the cap is greater than the thickness of the thin part where the cap engages.

6 Claims, 2 Drawing Sheets

BALL-JOINT SUPPORT FOR THIN PARTS

OBJECT OF THE INVENTION

As stated in the title of this descriptive specification, the present invention relates to a ball-joint support in thin parts which is for the purpose of connecting a ball-joint inserted into an axis to a thin part, which will be able to safely tip an angular space, whenever necessary, due to the attachment by means of the aforementioned ball-joint.

Mention must be made of the improvement of the properties of the new materials which are currently being used (carbon fiber, glare, etc.) and the optimization of the designs for reducing the weight of the different airplanes and other aircraft and therefore reducing aspects including consumption, entailing a reduction in thicknesses of the different structures and parts.

Therefore, the object of the invention is a characteristic ball-joint support, which makes possible to connect with complete security a part or structure of small thickness with a ball-joint, achieving a fully firm and solid union.

BACKGROUND OF THE INVENTION

The trend in airplanes and other aircraft is currently the use of new materials reducing weight and therefore also a reduction of the thicknesses in the different parts.

In these cases, in which the thickness of the parts it reduced, problems arise when ball joints are integrated into said parts of small thickness so that they can tip slightly when necessary, such that the ball joints will be inserted into respective axes.

The problems arise essentially because the thickness of the parts which incorporate the ball joints is noticeably smaller than the length of the ball joint, as a result of which the seating of the aforesaid ball joint on the respective part is weak and unstable.

In other cases, the thickness of the parts is adapted to the width of the ball joint seating, as a result of which there is very little reduction in weight.

DESCRIPTION OF THE INVENTION

For the purpose of achieving the objectives and preventing the drawbacks mentioned in the preceding paragraphs, the invention proposes a ball-joint support in thin parts which is characterized by comprising a cap, inside of which a ball-joint is inserted, whilst externally said cap is inserted into a paired opening of the respective thin part manufactured from composite materials.

The ball-joint is inserted in turn into a longitudinal axis.

The cap is longer in length than the width of the thin part where it is inserted, such that the cap will be axially held in place mechanically with respect to the thin part.

For this purpose, the cap has an annular end rib projection where it butts up against one of the sides of the thin part and a screw nut opposite said rib which screws into the other end segment of the cap, said screw nut butting up against the other paired side of the thin part, with a washer positioned in between.

Another characteristic of the invention is that there is an adhesive material on the surface where the cap and the thin part are in contact so that these two elements are joined together by said contact surface and thus preventing the cap from turning.

Thus, the characteristic cap is long enough to accommodate both the ball-joint as well as the screw nut and washer which assure the union.

For a better comprehension of this specification and comprising an integral part thereof, some figures are attached hereto in which the object of the invention has been depicted for illustrative, non-limiting purposes.

DESCRIPTION OF THE PREFERRED EMBODIMENT

Figure 1:
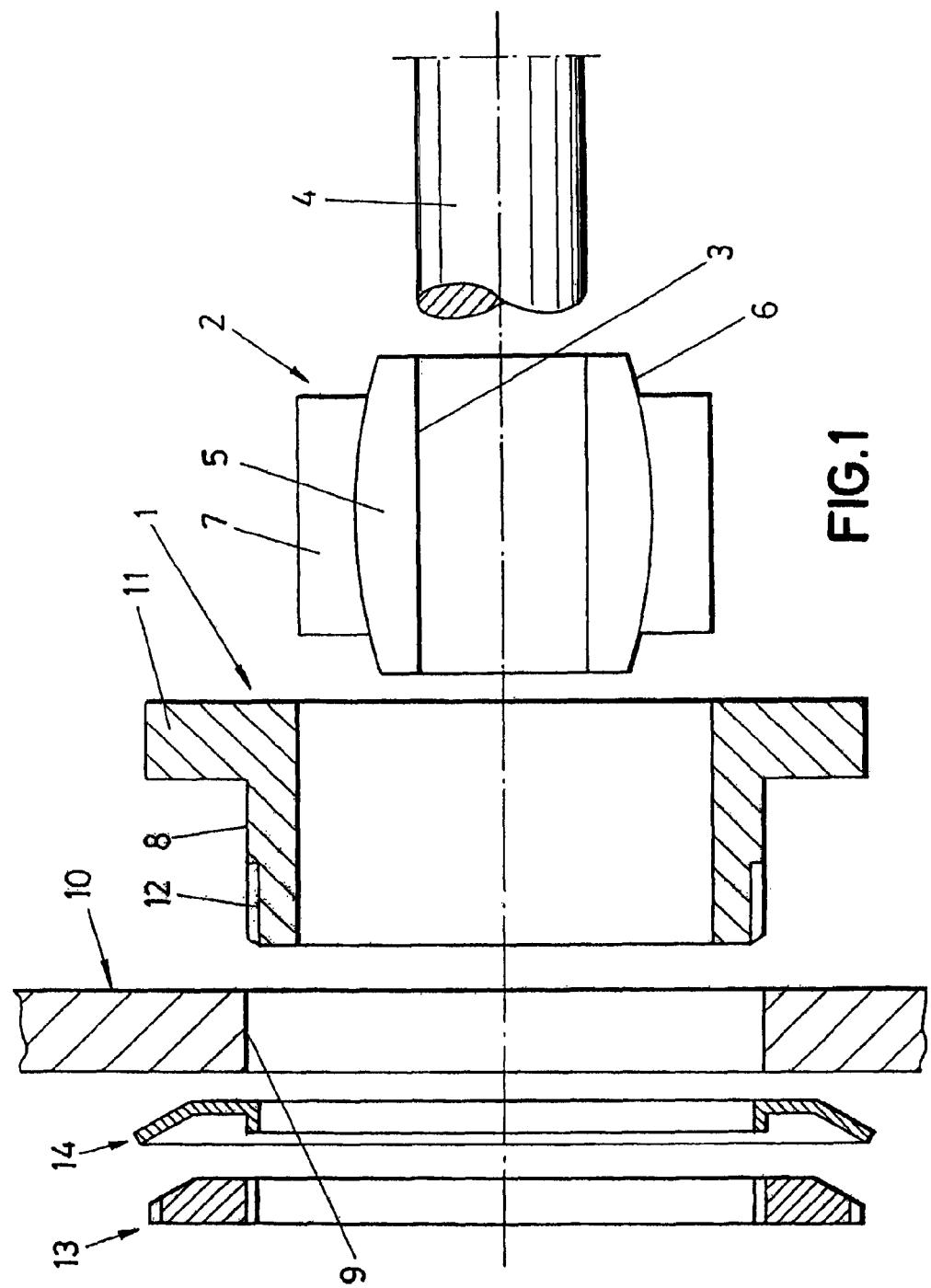
FIG. 1. Shows an amplified perspective view of the ball-joint support in thin parts, the object of the invention.
Figure 2:
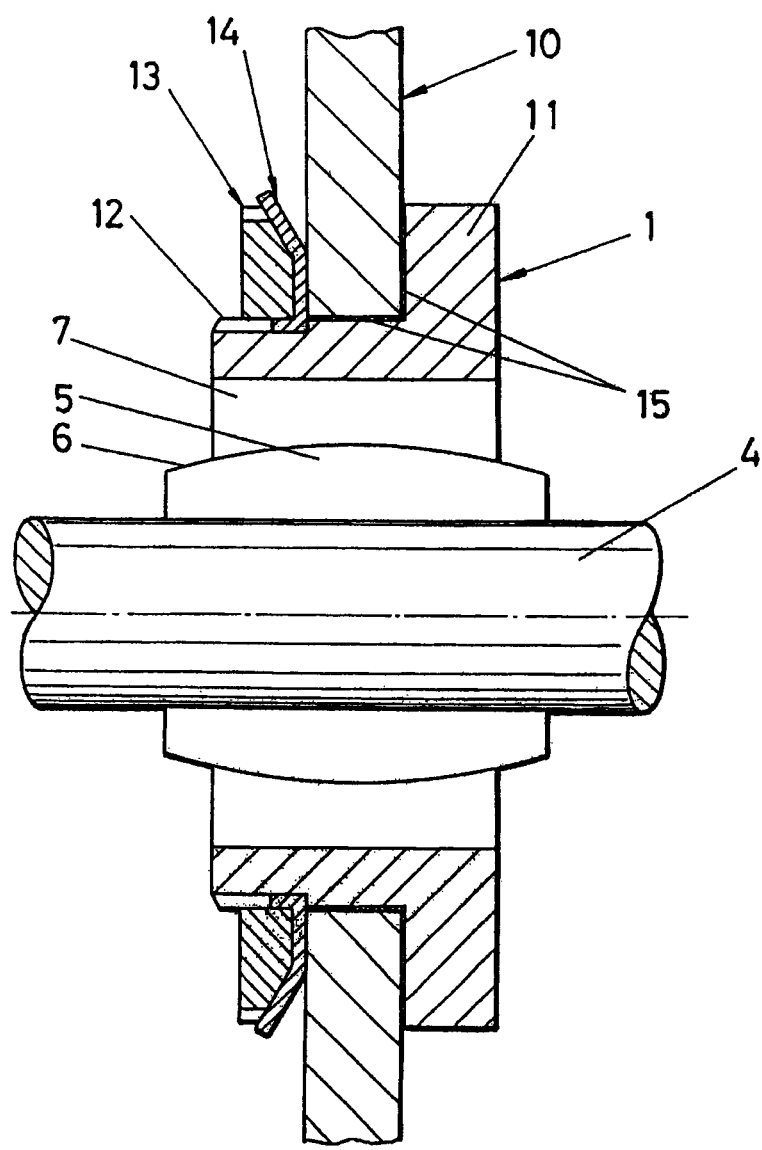
FIG. 2. Shows a cross-sectional view of the support of the invention in mounted position.

Taking into account the numbering adopted in the figures, the ball-joint support in thin parts is determined by a cap 1, into the inside of which a ball-joint 2 is inserted, this ball-joint being inserted, in turn, into a coaxial orifice 3 on a longitudinal axis 4.

The ball-joint 2 is a conventional body and comprises mainly a first inside segment 5 longer in length which includes the aforesaid coaxial orifice 3 and a curved outer surface 6 where a second external part 7 shorter in length is complementarily attached, inserted into the aforementioned cap 1 which is of the same length as said external part 7.

On the other hand, the cap 1 externally has a centered seat 8 for fitting into a cylindrical opening 9 of a thin part 10, a rear end rib projection 11 where the thin part 10 butts along one of its sides and front end threading 12 where a retaining nut 13 which butts against the other paired side of the thin part, with a washer 14 placed in between. As is evident from FIG. 1, the washer 14 includes a radially outermost end and a radially innermost end. The radially outermost end and the radially innermost end of the washer 14 are directed away from the thin part.

On the other hand, on the contact surface between the cap 1 and the thin part 10, there is an adhesive material 15 so that these two elements are joined together by said contact surface and to thus prevent the cap from turning.

This results in a firm and solid union of the ball-joint support on the thin part.

The invention claimed is:

1. An assembly comprising:
a ball-joint support;
a thin part; and
a ball joint, wherein
the ball-joint is operably coupled to the thin part, and includes:
an inner part with a central coaxial orifice through which a longitudinal axis is operably introduced, and
an outer part that engages complementarily to the inner part,
the ball joint support comprises:
a cap including a central through hole in which the ball joint is embedded inside via the outer part, and externally, the cap is embedded in a cylindrical opening included in the thin part,
an annular end rib projection which abuts at an upper end of the cap against an upper side of the thin part,
a screw nut coupled to a front end threading at a lower end of the cap which abuts at a lower side of the thin part, and an intermediate washer placed between the lower side of the thin part and the screw nut, the thickness of the cap is greater than the thickness of the thin part where the cap engages, the intermediate washer includes a radially outermost end and a radially innermost end, and the radially outermost end and the radially innermost end of the intermediate washer are directed away from the thin part.

2. The assembly according to claim 1, wherein on at least one part of a contact surface between the cap and the thin part there is adhesive material disposed so that the contact surface between the cap and the thin part are joined together by the contact surface.

3. The assembly according to claim 2, wherein the thickness of the cap coincides with a thickness of the outer part of the ball-joint.

4. The assembly according to claim 1, wherein the thickness of the cap coincides with a thickness of the outer part of the ball-joint.

5. The assembly according to claim 1, wherein the ball-joint rotates inside of the cap.

6. The assembly according to claim 1, wherein the outer part of the ball-joint is parallel to an inner surface of the cap.

* * * * *